(12) United States Patent
Lim et al.

(10) Patent No.: US 12,073,207 B2
(45) Date of Patent: Aug. 27, 2024

(54) SOFTWARE UPDATE GATEWAY AND METHOD FOR UPDATING SOFTWARE OF IoT DEVICE

(71) Applicant: LG ELECTRONICS INC., Seoul (KR)

(72) Inventors: Kwangsoo Lim, Seoul (KR); Hojoong Jeong, Seoul (KR); Jangmuk Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 18/009,967

(22) PCT Filed: Oct. 16, 2020

(86) PCT No.: PCT/KR2020/014180
§ 371 (c)(1),
(2) Date: Dec. 12, 2022

(87) PCT Pub. No.: WO2022/080539
PCT Pub. Date: Apr. 21, 2022

(65) Prior Publication Data
US 2023/0350669 A1 Nov. 2, 2023

(51) Int. Cl.
G06F 8/658 (2018.01)
G06F 8/71 (2018.01)
(52) U.S. Cl.
CPC .............. *G06F 8/658* (2018.02); *G06F 8/71* (2013.01)
(58) Field of Classification Search
CPC .................................. G06F 8/658; G06F 8/71
See application file for complete search history.

(56) References Cited

U.S. PATENT DOCUMENTS 10,481,901 B2 * 11/2019 Subramanian .......... G06F 8/654
10,514,900 B2 * 12/2019 Teraoka .................. G06F 11/00
(Continued)

FOREIGN PATENT DOCUMENTS

CN 110471692 A 11/2019
CN 110597546 A 12/2019
(Continued)

OTHER PUBLICATIONS

International Search Report for PCT/KR2020/014180 (PCT/ISA/210) mailed on Jul. 15, 2021.

*Primary Examiner* — Douglas M Slachta
(74) *Attorney, Agent, or Firm* — Birch, Stewart, Kolasch & Birch, LLP

(57) ABSTRACT

A software update gateway for updating a software of an IoT (Internet of Things) device. The gateway includes a transceiver configured to connect to a software update server through a public network, connect to at least one first IoT device through the public network, and connect to at least one second IoT device through a local network of the at least one second IoT device; a software database configured to store a first version of a full update data for a software of the at least one first IoT device; and a processor configured to control the transceiver to receive a software update request from the at least one first IoT device via the public network, control the transceiver to transfer the software update request to the software update server via the public network, control the transceiver to receive differential update data for the software of the at least one first IoT device from the software update server via the public network, generate a second version of the full update data for the software of the at least one first IoT device based on the first version and the differential update data, and control the transceiver to transmit the generated second version of the full update data of the at least one first IoT device to the at least one first IoT (Continued)

device via the public network based on a collected operational status of the software update gateway.

20 Claims, 10 Drawing Sheets

(56) References Cited

U.S. PATENT DOCUMENTS

| | | | |
|---|---|---|---|
| 10,693,720 B2* | 6/2020 | Frahim | H04L 41/0893 |
| 11,379,216 B2* | 7/2022 | Kang | G06F 8/658 |
| 11,425,632 B2* | 8/2022 | Sood | H04L 67/34 |
| 2007/0294685 A1* | 12/2007 | Oh | G06F 8/658 |
| | | | 717/168 |
| 2014/0304700 A1 | 10/2014 | Kim et al. | |
| 2015/0355899 A1 | 12/2015 | Agarwal et al. | |
| 2019/0138295 A1* | 5/2019 | Agerstam | G06F 8/65 |
| 2019/0265965 A1 | 8/2019 | Acharya et al. | |
| 2019/0334869 A1* | 10/2019 | Grant | H04L 61/5007 |
| 2020/0177444 A1* | 6/2020 | Nelson-Gal | H04L 67/56 |
| 2020/0285457 A1* | 9/2020 | Meriac | H04L 67/34 |
| 2020/0311274 A1* | 10/2020 | Cooke | G06F 8/65 |
| 2020/0379749 A1* | 12/2020 | Zhu | H04L 67/61 |
| 2021/0349710 A1 | 11/2021 | Kang et al. | |
| 2022/0417086 A1* | 12/2022 | Klitte | H04L 41/0803 |

FOREIGN PATENT DOCUMENTS

| | | |
|---|---|---|
| CN | 111585801 A | 8/2020 |
| JP | 2004-328578 A | 11/2004 |
| KR | 10-2014-0122072 A | 10/2014 |
| KR | 10-2017-0016347 A | 2/2017 |
| KR | 10-2018-0031415 A | 3/2018 |
| KR | 10-2088167 B1 | 3/2020 |
| WO | WO 2018/154949 A1 | 8/2018 |

* cited by examiner

FIG. 11

| | Manufacturer Name (1111) | Device Name (1112) | Device Identification Information (1113) | SW Name (1114) | SW Identification Information (1115) | Current SW Version (1116) | Latest SW Version (1117) |
|---|---|---|---|---|---|---|---|
| 1121 | AA Electronics | Air Conditioner | AA_01 | Air Conditioner Firmware | AA_AIR | v1 | v1 |
| 1122 | AA Electronics | Living Room Lamp | AA_02 | Lamp Firmware | AA_LAMP | v1 | v2 |
| 1123 | AA Electronics | Bed Room Lamp | AA_03 | Lamp Firmware | AA_LAMP | v2 | v2 |
| 1124 | BB Computer | Washing Machine | BB_01 | Washing Machine Firmware | BB_WASH | v3 | v3 |
| 1125 | BB Computer | Security Camera | BB_02 | Camera Firmware | BB_CAM | v2 | v4 |
| 1126 | CC Electronics | Toilet Lamp | CC_01 | Lamp Firmware | CC_LAMP | v1 | v2 |

| | SW Identification Information | SW Version | Differential Update Data | Full Update Data |
|---|---|---|---|---|
| 1221 | AA_AIR | v1 | | AA_AIR_v1 |
| 1222 | AA_LAMP | v1 | | AA_LAMP_v1 |
| | | v2 | ▨ | AA_LAMP_v2 ▨ |
| 1223 | BB_WASH | v3 | | BB_WASH_v3 |
| 1224 | BB_CAM | v2 | | BB_CAM_v2 |
| | | v3 | ▦ | BB_CAM_v3 ▦ |
| | | v4 | ▩ | BB_CAM_v4 ▩ |
| 1225 | CC_LAMP | v1 | | CC_LAMP_v1 |
| | | v2 | ▦ | CC_LAMP_v2 ▦ |

1211, 1212, 1213, 1214

SOFTWARE UPDATE GATEWAY AND METHOD FOR UPDATING SOFTWARE OF IoT DEVICE

CROSS-REFERENCE TO RELATED APPLICATION

This application is the National Phase of PCT International Application No. PCT/KR2020/014180 filed on Oct. 16, 2020, which is hereby expressly incorporated by reference into the present application.

TECHNICAL FIELD

The present disclosure relates to a software update gateway and method for updating software of an Internet of Things (IoT) device.

BACKGROUND ART

The number of IoT devices equipped with a communication function to transmit and receive data to and from other devices has significantly increased. The IoT devices also perform a given operation through built-in software, which is updated as needed.

In particular, the IoT devices can update the software by receiving an update file provided from a software update server. However, as the number of IoT devices significantly increases, the data traffic in a network due to the software updates of the IoT devices also greatly increases.

In addition, the amount of traffic that a network can handle is limited, and it is expensive to increase the capacity of such a network. Therefore, there is a need for updating software of IoT devices while effectively reducing data traffic.

SUMMARY

Accordingly, one object of the present disclosure is to provide a software update gateway and a method for updating software of an IoT device while reducing data traffic of a public network.

According to one embodiment, the present disclosure provides a software update gateway for updating the software of an IOT device. The gateway includes a communication unit configured to connect to a software update server and an IoT device, a software database configured to store first version full update data for a software of the IoT device, and a processor configured to receive a software update request from the IoT device via the communication unit, transfer the software update request to the software update server via the communication unit, receive second version differential update data for the software from the software update server, generate second version full update data for the software based on the first version full update data and the second version differential update data, and update the software by transmitting the second version full update data to the IoT device via the communication unit.

The software database can further store software metadata for the software including, for example, device identification information, software identification information, and software version information. The processor can receive the software metadata for the software from the IoT device via the communication unit, determine whether the software is updatable based on the software metadata, and transmit a software update notification to the IoT device through the communication unit when the software is updateable.

In addition, the processor can compare software version information of the software in the IoT device with software version information in the software update server to determine whether the software is updateable. The processor can collect status information of the software update gateway, and determine whether to generate the second version full update package based on the status information of the software update gateway.

Further, the status information of the software update gateway may include at least one of a temperature of the software update gateway, processor resource usage, available processor resources, memory usage, available memory, network usage, available networks, or operation process types. Also, the processor can determine to generate the second version full update package when the temperature for the software update gateway is less than a first reference value and the available processor resources are greater than a second reference value.

The processor can also perform a process of generating the second version full update package in the background when the processor determines to generate the second version full update package. The processor can collect status information of the IoT device from the IoT device via the communication unit, and determine whether to update the software based on the status information of the IoT device.

The status information of the IoT device may include at least one of a temperature of the IoT device, processor resource usage, available processor resources, memory usage, available memory, network usage, available networks, operation process types, a power status, or a power supply status. In addition, the processor may determine to update the software when the temperature of the IoT device is less than a third reference value, the available processor resources are greater than a fourth reference value, and the power status is a power-on status. Further, the communication unit can connect to the software update server through a public network and connect to the IoT device through a local network.

According to an embodiment, the present disclosure provides a method of a software of an IoT device including receiving a software update request for the software of the IoT device from the IoT device via the communication unit, transferring the software update request to a software update server via the communication unit, receiving second version differential update data for the software from the software update server via the communication unit, generating second version full update data for the software based on first version full update data for the software and the second version differential update data, the first version full update data being stored in a software database, and updating the software by transmitting the second version full update data to the IoT device via the communication unit.

Advantageous Effects

According to various embodiments of the present disclosure, it is possible to effectively reduce data traffic of a public network in the process of updating software of an IoT device. In addition, the security is increased by transmitting only differential update data to a public network. Further, the software update gateway stores and manages software data of the IoT device for each version, enabling easy rollback to the previous version when a problem occurs in the software after the update.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 11 is a diagram illustrating an example of a software metadata table stored in a software database of a software update gateway.

FIG. 12 is a diagram illustrating an example of software update data stored in a software database of a software update gateway.

DETAILED DESCRIPTION

Figure 1:
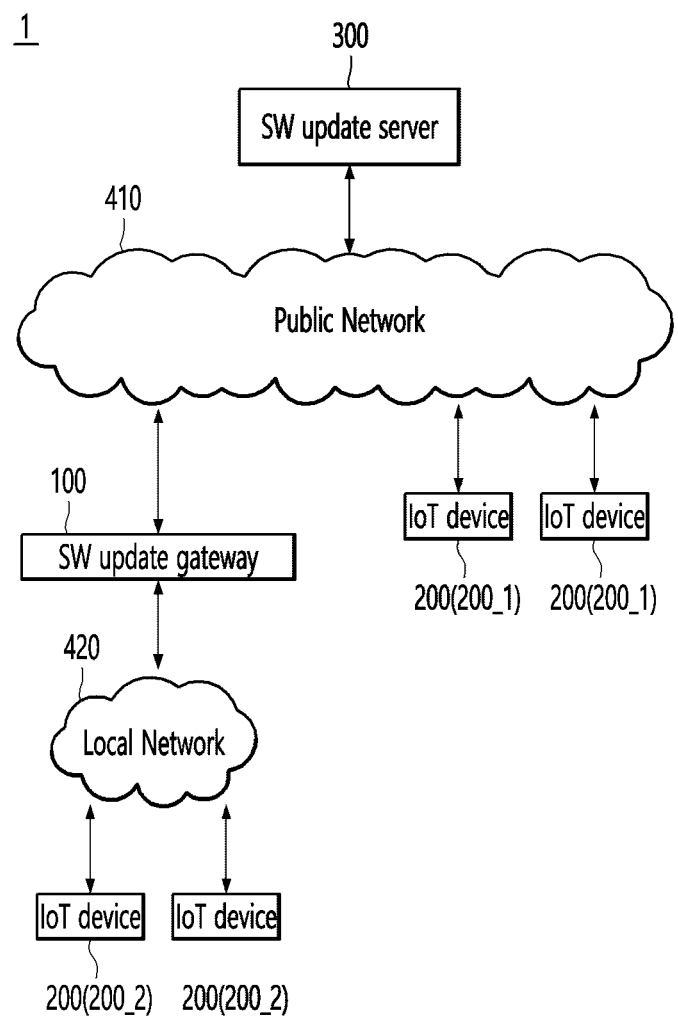
FIG. 1 is a diagram illustrating a software update system for an IoT device according to an embodiment of the present disclosure.

Hereinafter, the embodiments will be described in detail with reference to the accompanying drawings, and the same or similar elements are designated with the same numeral references regardless of the numerals in the drawings and their redundant description will be omitted. The suffixes "module" and "unit or portion" for components used in the following description are merely provided only for facilitation of preparing this specification, and thus they are not granted a specific meaning or function.

The terms coming with ordinal numbers such as 'first', 'second', or the like may be used to denote various components, but the components are not limited by the terms. The terms are used merely for the purpose to distinguish a component from the other component.

When an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

FIG. 1 is a diagram illustrating a software update system 1 of an IoT device according to an embodiment of the present disclosure. as shown in FIG. 1, the software update system 1 includes a software update gateway 100, at least one IoT device 200, a software update server 300 and the like.

In addition, the IoT device 200 includes a communication function for transmitting and receiving data with other IoT devices, terminals, servers or the like. The IoT device 200 includes refrigerators, air conditioners, washing machines, ovens, TVs, fans, electric heating appliances, cooking appliances, cameras, switches, sensors, outlets, and electronic control units (ECUs) of vehicle parts.

The IoT device 200 also includes built-in operational software that can be updated using update data provided from the software update server 300. The software of the IoT device 200 includes firmware, an operating system, a kernel, an application program, and the like.

The update of software can be performed according to a full update method of transmitting full software data and overwriting existing software data with the full software data or a differential update method of transmitting only differential software data indicating software changes due to update and reflects only the changes in existing software data. The differential update method has an advantage in that network data traffic is smaller than that of the full update method, but requires an increase in computation power to generate differential software data and update software using the differential software data. That is, there is a trade-off relationship between network data traffic and computation power. Although the computation power required to generate differential software data and update software using the differential software data increases, it is preferable to reduce network data traffic, so that the differential update method is technically or economically meaningful than the full update method.

In addition, the IoT device 200 may lack computation power or resources to update software using differential software data. In this instance, the IoT device 200 updates software through the full update method rather than the differential update method. On the other hand, when the IoT device 200 has sufficient computational resources to update software using differential software data, the IoT device 200 can update the software according to the differential update method instead of the full update method. Further, because the software of the IoT device 200 has a small capacity, the full update method does not use a large amount of network data traffic from the viewpoint of an individual IoT device 200. However, when the number of IoT devices 200 significantly increases, the network data traffic increases from the viewpoint of a network even when the size of individual full software data is small.

Further, the IoT device 200 can be classified into an IoT device 200_1 directly connected to the software update server 300 via a public network 410 and an IoT device 200_2 indirectly connected to the software update server 300 via the software update gateway 100 connected to the software update server 300 via a local network 420. In the present disclosure, the IoT device 200_1 is referred to as a first type IoT device, and the IoT device 200_2 is referred to as a second type IoT device.

In addition, the first type IoT device 200_1 can be directly connected to the software update server 300 via the public network 410 according to a direct connection method. When the first type IoT device 200_1 supports the differential update method, the first type IoT device 200_1 can receive only differential update data from the software update server 300 and update the software. Accordingly, the amount of communication between the software update server 300 and the first type IoT device 200_1 can be reduced.

Further, the second type IoT device 200_2 is connected to the software update gateway 100 via the local network 420 according to a gateway connection method or an indirect connection method, and is indirectly connected to the software update server 300 through the software update gateway 100. When the second type IoT device 200_2 supports the differential update method, the first type IoT device 200_1 can receive only differential update data from the software update gateway 100 and update the software. In addition, when the second type IoT device 200_2 does not support the differential update method, the second type IoT device 200_2 can receive the full update data from the software update gateway 100 and update the software. A detailed description thereof will be given later.

Also, the software update server 300 manages and updates software of the IoT device 200, and includes one or more servers. Also, the software update server 300 cam manage and update software of the software update gateway 100.

Further, the software update server 300 can communicate directly with the software update gateway 100 and the first type IoT device 200_1 via the public network 410, and communicate indirectly with the second type IoT device 200_2 through the software update gateway 100. In addition, the software update server 300 can exist individually for each manufacturer of the IoT device 200, individually for each manufacturer of the software update gateway 100, or individually for each IoT platform.

Also, the software update gateway 100 refers to a device connected to the second type IoT device 200_2 via the local network 420 based on communication technology such as Bluetooth or Wi-Fi, and capable of managing and controlling the second type IoT device 200_2 and communicating with the software update server 300 via the public network 410. For example, the software update gateway 100 can include various devices such as a wireless access point, a TV, a mobile phone, a smart phone, and a smart speaker.

The software update gateway 100 can also be implemented with the IoT device 200, and in this instance, a master IoT device 200 that manages other IoT devices 200 can be referred to as the software update gateway 100. The IoT device 200 serving as a hub in a relationship with other IoT devices 200 and having computation power and resources capable of generating differential update data from full update data of other IoT devices 200 can function as the software update gateway 100.

In addition, the software update gateway 100 can connect to the software update server 300 corresponding to the second type IoT device 200_2 via the public network 410, receive software update data corresponding to the second type IoT device 200_2 from the software update server 300, and update the software of the connected second type IoT device 200_2.

The software update gateway 100 can also receive software update data for the second type IoT device 200_2 via the public network 410, which increases the data traffic of the public network 410. However, the software update gateway 100 can update the software of the second type IoT device 200_2 while reducing data traffic of the public network 410 through a method described later.

Figure 2:
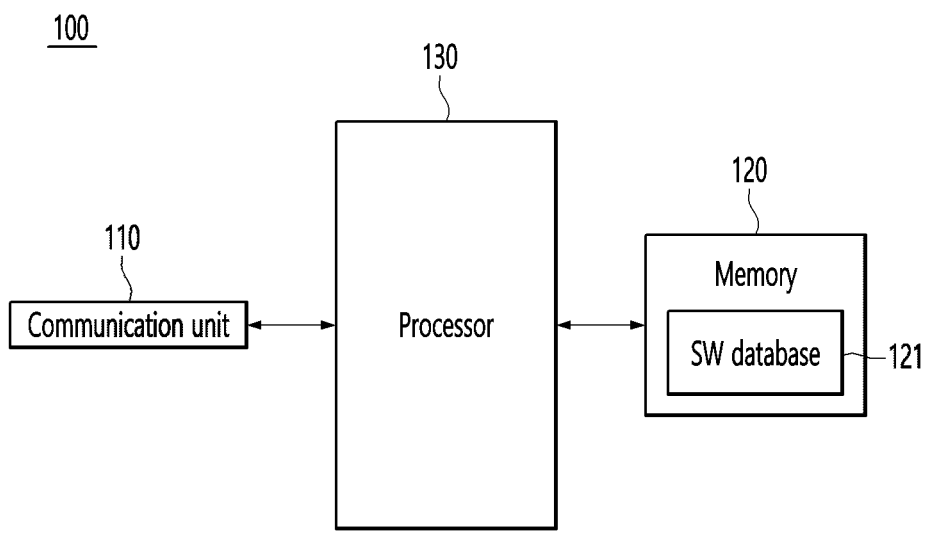
FIG. 2 is a block diagram illustrating a software update gateway according to an embodiment of the present disclosure.

Next, FIG. 2 is a block diagram illustrating a software update gateway 100 according to an embodiment of the present disclosure. as shown, the software update gateway 100 includes a communication unit 110, a memory 120, and a processor 130.

In particular, the communication unit 110 can perform a wired or wireless communication with an external electronic device. For example, the communication unit 110 can transmit and receive sensor information, a user input, a learning model, and a control signal to and from external devices. The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The communication unit 110 can be referred to as a communication modem or a communication interface and can communicate with the software update server 300 via the public network 410 and communicate with the second type IoT device 200_2 via the local network 420.

The communication unit 110 can also transmit a software update request from the software update gateway 100 to the software update server 300 and directly receive software update data from the software update server 300. The software update data includes a full update data or differential update data.

In addition, the communication unit 110 can receive a software update request from the second type IoT device 200_2, transmit the software update request of the second type IoT device 200_2 to the software update server 300, receive software update data for the second type IoT device 200_2 from the software update server 300, and transmit the software update data to the second type IoT device 200_2. The software update data includes full update data or differential update data.

The memory 120 can temporarily or permanently store a program for each signal processing and control in the processor 130, a signal-processed image, an audio or data signal, and the like. The memory 120 can also store software and software metadata for operation of the software update gateway 100. The software includes firmware, a kernel, an operating system, an application program and the like. Also, the software metadata includes device identification information, software identification information, software version information, and the like.

Further, as shown in FIG. 2, the memory 120 includes a software database 121 that stores software data and software metadata for each IoT device 200. In particular, the software database 121 can store software data for each IoT device 200 and software metadata corresponding to the software data for each version. The software data includes full update data, differential update data, update changes, and the like, and the software metadata includes device identification information, software identification information, software version information, and the like.

In addition, the processor 130 controls the overall operation of the software update gateway 100. For example, the processor 130 can transmit a software update request of the software update gateway 100 to the software update server 300 through the communication unit 110, receive software update data from the software update server 300 through the communication unit 110, and then update software using the received software update data. The software update request may include software metadata for the software update gateway 100.

Further, the processor 130 can transmit a software update request of the second type IoT device 200_2 to the software update server 300 through the communication unit 110, receive software update data of the second type IoT device 200_2 from the software update server 300 through the communication unit 110, then generate software update data for the second type IoT device 200_2 using the received software update data, and transmit the generated software update data to the second type IoT device 200_2 through the communication unit 110. The software update request may include software metadata for the software update gateway 100.

Specifically, the processor 130 can receive differential update data for the second type IoT device 200_2 from the software update server 300 through the communication unit 110, generate full update data for the second type IoT device 200_2 based on the received differential update data, and transmit the generated full update data to the second type IoT device 200_2 through the communication unit 110 to update software of the second type IoT device 200_2. To this end, the processor 130 can reconstruct a new version of full update data based on previous version software data stored in the software database 121 and the differential update data.

When the differential update method is supported, the processor 130 can transmit a software update request according to the differential update method when transmitting the software update request. On the other hand, when the differential update method is not supported, the processor 130 can transmit a software update request according to the full update method when transmitting the software update request.

When the software update data is the full update data, the processor 130 can update the software by overwriting existing software data with the received full update data. Alternatively, when the software update data is the differential update data, the processor 130 can update the software by combining the received differential update data with the existing software data.

In addition, the software update gateway 100 shown in FIG. 2 is merely an example, and some of the illustrated components are integrated, added, or can be omitted according to the specifications of the software update gateway 100 that is practically implemented. According to various implementations, the software update gateway 100 may include components such as a microphone, a camera, a sensor, a display, and a speaker to provide various functions.

Figure 3:
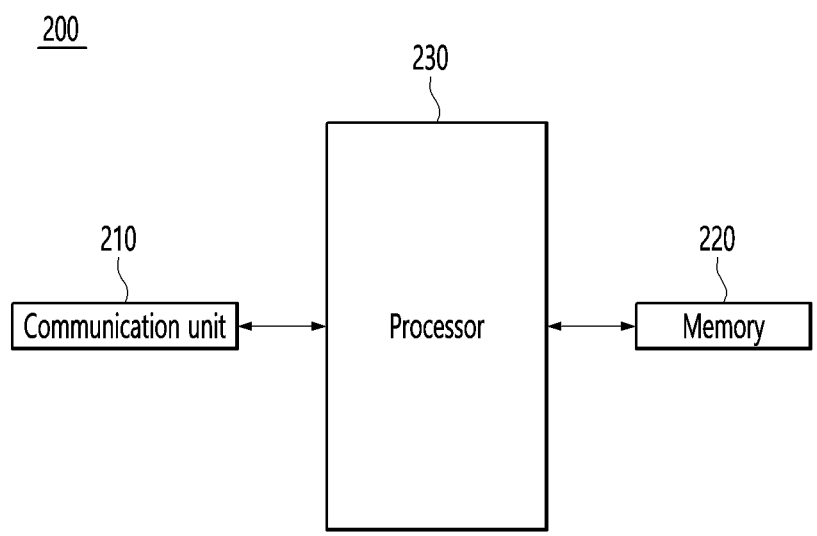
FIG. 3 is a block diagram illustrating an IoT device according to an embodiment of the present disclosure.

Next, FIG. 3 is a block diagram illustrating an IoT device 200 according to an embodiment of the present disclosure. Referring to FIG. 3, the IoT device 200 includes a communication unit 210, a memory 220, and a processor 230.

In more detail, the communication unit 210 can perform a wired or wireless communication with an external electronic device. For example, the communication unit 210 can transmit and receive sensor information, a user input, a learning model, and a control signal to and from external devices.

The communication technology used by the communication unit 210 includes GSM, CDMA, LTE, 5G, WLAN, Wi-Fi, Bluetooth™, RFID, IrDA, ZigBee, NFC, and the like.

Also, the communication unit 210 can be referred to as a communication modem or a communication interface. The communication unit 210 can also directly communicate with the software update server 300 via the public network 410, or directly communicate with the software update gateway 100 via the local network 420 to indirectly communicate with the software update server 300. As described above, among the IoT devices 200, an IoT device directly communicating with the software update server 300 can be classified as a first type of IoT device 200_1, and an IoT device indirectly communicating with the software update server 300 through the software update gateway 100 can be classified as a second type of IoT device 200_2.

The communication unit 210 can transmit a software update request to the software update server 300 through the software update gateway 100 or directly, and receive software update data directly from the software update server 300 or through the software update gateway 100. The software update data includes full update data or differential update data.

Also, the memory 220 can temporarily or permanently store a program for each signal processing and control in the processor 230, a signal-processed image, an audio or data signal, and the like. The memory 220 can also store software and software metadata for operation of the IoT device 200, and the software may include firmware, a kernel, an operating system, an application program and the like. The software metadata can also include device identification information, software identification information, software version information, and the like.

Further, the processor 230 controls the overall operation of the IoT device 200. For example, the processor 230 can transmit a software update request to the software update gateway 100 or the software update gateway 300 through the communication unit 210, receive software update data from the software update gateway 100 or the software update gateway 300 through the communication unit 210, and then update software using the received software update data. The software update request can include software metadata for the IoT device 200.

When the differential update method is supported, the processor 230 can transmit a software update request according to the differential update method when transmitting the software update request. On the other hand, when the differential update method is not supported, the processor 230 can transmit a software update request according to the full update method when transmitting the software update request.

When the software update data is the full update data, the processor 230 can update the software by overwriting existing software data with the received full update data. Alternatively, when the software update data is differential update data, the processor 230 can update the software by combining the received differential update data with the existing software data.

Further, the IoT device 200 shown in FIG. 3 is merely an example, and some of the illustrated components are integrated, added, or can be omitted according to the specifications of the IoT device 200 that is practically implemented. According to various implementations, the IoT device 200 can include components such as a microphone, a camera, a sensor, a display, and a speaker to provide various functions.

Figure 4:
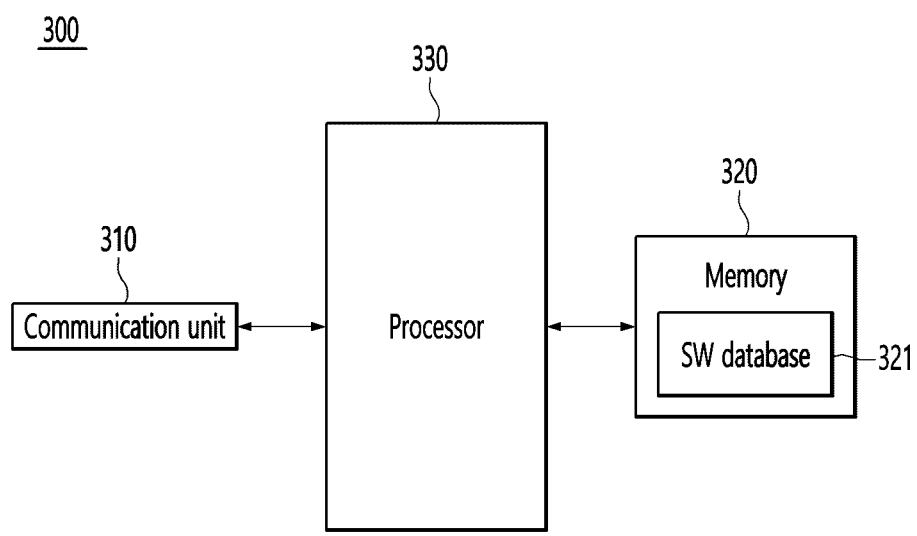
FIG. 4 is a block diagram illustrating a software update server according to an embodiment of the present disclosure.

Next, FIG. 4 is a block diagram illustrating a software update server 300 according to an embodiment of the present disclosure. Referring to FIG. 4, the software update server 300 includes a communication unit 310, a memory 320, and a processor 330.

The communication unit 310 can perform a wired or wireless communication with an external electronic device. For example, the communication unit 310 can transmit and receive sensor information, a user input, a learning model, and a control signal to and from external devices.

The communication technology used by the communication unit 310 includes GSM, CDMA, LTE, 5G, WLAN, Wi-Fi, Bluetooth, RFID, IrDA, ZigBee, NFC, and the like. The communication unit 310 can be referred to as a communication modem or a communication interface.

Further, the communication unit 310 can communicate with the first type of IoT device 200_1 or the software update gateway 100 through the public network 410. The communication unit 310 can also receive a software update request of the IoT device 200 from the first type of IoT device 200_1 or the software update gateway 100, and transmit the software update data the first type of IoT device 200_1 or the software update gateway 100 based on the update request. The software update data includes full update data or differential update data. The communication unit 310 can communicate with a manufacturer server of the IoT device 200 and receive software data of each IoT device 200 from the manufacturer server.

Also, the memory 320 can temporarily or permanently store a program for each signal processing and control in the processor 330, a signal-processed image, an audio or data signal, and the like. As shown, the memory 320 can include a software database 321 that stores software data and software metadata for each IoT device 200. The software database 321 can store software data for each IoT device 200 and software metadata corresponding to the software data for each version. The software data can include full update data, differential update data, update changes, and the like, and the software metadata can include device identification information, software identification information, software version information, and the like.

The processor 330 also controls the overall operation of the software update server 300. For example, the processor 330 can generate or determine software update data for software update of the IoT device 200 or the software updater gateway 100 and transmit the software update data to the first type of IoT device 200_1 or the software update gateway 100 through the communication unit 310, based on the software update request received from the first type of IoT device 200_1 or the software update gateway 100.

The processor 330 can generate differential update data for updating software of the IoT device 200 or the software update gateway 100, and transmit generated difference update data to the first type of IoT device 200_1 or the software update gateway 100 through the communication unit 310.

In addition, the software update server 300 shown in FIG. 4 is only an example, and some of the illustrated components can be integrated, added, or omitted according to the specifications of the software update server 300 that are practically implemented. In an embodiment, two or more components of the software update server 300 can be combined into one component, or one component can be divided into two or more components as necessary.

Figure 5:
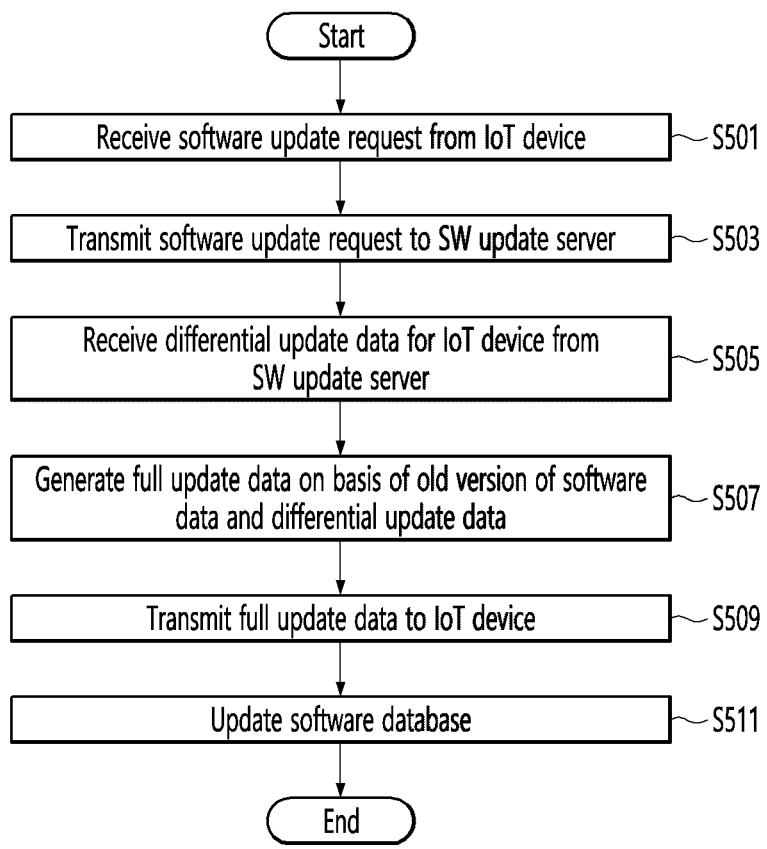
FIG. 5 is a flowchart illustrating a method for updating software of an IoT device according to an embodiment of the present disclosure.

Next, FIG. 5 is a flowchart illustrating a method for updating software of an IoT device according to an embodiment of the present disclosure. Referring to FIG. 5, the processor 130 of the software update gateway 100 receives a software update request from the IoT device 200 through the communication unit 110 (S501). The software update request can include software metadata including device identification information, software identification information, and software version information of the IoT device 200 and the like.

The processor 130 can connect to the IoT device 200 through the communication unit 110, obtain software metadata of the IoT device 200 through the communication unit 110, and update the software database 121 based on the software metadata. The software database 121 can store software metadata of the IoT device 200 and full update data (or full update package) corresponding thereto.

Then, the processor 130 of the software update gateway 100 transmits the software update request of the IoT device 200 to the software update server 300 through the communication unit 110 (S503). The processor 130 can determine an update target software, a pre-update version (or an old version) and a post-update version (or a new version) of the update target software, based on the software metadata of the IoT device 200 in which software update is scheduled and request differential update data for update of the update target software from the software update server 300 through the communication unit 110.

Hereinafter, the pre-update version or the old version is referred to as a first version, and the post-update version or the new version is referred to as a second version. Accordingly, the full update data of the pre-update version is referred to as a first version of the full update data.

Then, the processor 130 of the software update gateway 100 receives differential update data for the IoT device 200 from the software update server 300 through the communication unit 110 (S505). The differential update data (or differential update package) is for updating the update target software of the IoT device 200 from an old version to a new version. The new version can refer to the latest version.

Further, the processor 130 of the software update gateway 100 generates full update data based on the old version of software data and the differential update data (S507). In particular, the processor 130 can generate full update data (or full update package) corresponding to the new version of the software based on the old version of software data of the IoT device 200 stored in the software database 121 and the differential update data received from the software update server 300. A process of generating the full update data corresponding to the new version of the software from the old version of software data and the differential update data can be referred to as an update package reconstruct process or an update data repackage process.

Then, the processor 130 of the software update gateway 100 transmits the full update data for the update target software to the IoT device 200 through the communication unit 110 (S509). The processor 130 can update the update target software of the IoT device 200 by transmitting the full update data to the IoT device 200. Then, the processor 130 of the software update gateway 100 updates the software database 121 (S511).

After updating the update target software of the IoT device 200, the processor 130 can update the software database 121 such that the software metadata of the IoT device 200 is replaced with the updated metadata and store new version software data (full update data).

The order of the steps shown in FIG. 5 is only one example, and the present disclosure is not limited thereto. That is, according to an embodiment, the order of some of the steps shown in FIG. 6 can be performed in a reverse order. Also, some of the steps shown in FIG. 5 can be performed in parallel, and only some of the steps can be performed. In addition, FIG. 5 illustrates only a single cycle of a method of updating software of an IoT device, and the operation method in FIG. 5 can be repeatedly performed.

Figure 6:
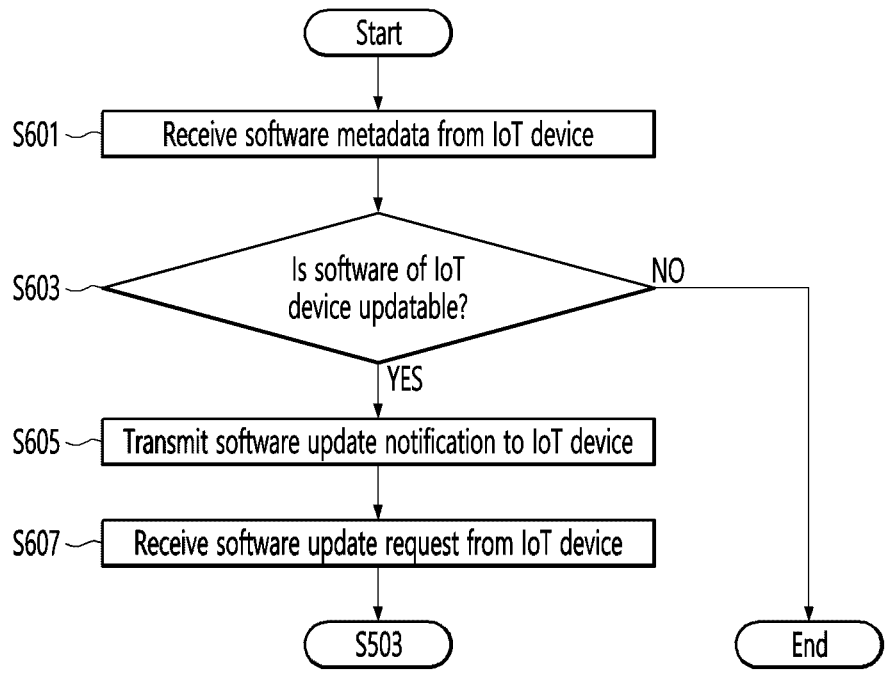
FIG. 6 is a flowchart illustrating an example of step S501 of receiving a software update request, shown in FIG. 5.

Next, FIG. 6 is a flowchart illustrating an example of step S501 of receiving a software update request, shown in FIG. 5. Referring to FIG. 6, the processor 130 of the software update gateway 100 can receive software metadata from the IoT device 200 through the communication unit 110 (S601).

The software update gateway 100 and the IoT device 200 are connected through a local network 420, and the software update gateway 100 can receive software metadata from the IoT device 200 and update the software database 121. This step S601 corresponds to step S511 of updating the software database 121 shown in FIG. 5, and can be omitted in some embodiments.

Then, the processor 130 of the software update gateway 100 can determine whether the software of the IoT device 200 is updatable (S603). The software update gateway 100 and the software update server 300 are connected through a public network 410, and the software update gateway 100 can compare the software metadata of the IoT device 200 with software metadata stored in the software update server 300 and determine whether the software of the IoT device 200 is updatable.

In one embodiment, the processor 130 can transmit software identification information and software version information of the IoT device 200 to the software update server 300 through the communication unit 110, and receive a result of determining whether the software of the IoT device 200 is updatable from the software update server 300. In another embodiment, the processor 130 can receive software version information corresponding to the software identification information of the IoT device 200 from the software update server 300 through the communication unit 110 and compare the software version information of the IoT device 200 with the software version information received from the software update server 300 to determine whether the software of the IoT device 200 is updatable.

As a result of the determination in step S603, when the software of the IoT device 200 is updatable (Yes in S603), the processor 130 of the software update gateway 100 can transmit a software update notification to the IoT device 200 through the communication unit 110 (S605). The software update notification can mean a notification indicating that software update is possible.

Then, the processor 130 of the software update gateway 100 can receive a software update request from the IoT device 200 through the communication unit 110 (S607). In particular, the software update request can be a response to the software update notification. When the software of the IoT device 200 is determined to be not updatable (No in S603), the process ends.

The order of the steps shown in FIG. 6 is only an example, and the present disclosure is not limited thereto. That is, according to an embodiment, the order of some of the steps shown in FIG. 6 can be performed in a reverse order and/or be performed in parallel. Also, only some of the steps shown in FIG. 6 can be performed.

Figure 7:
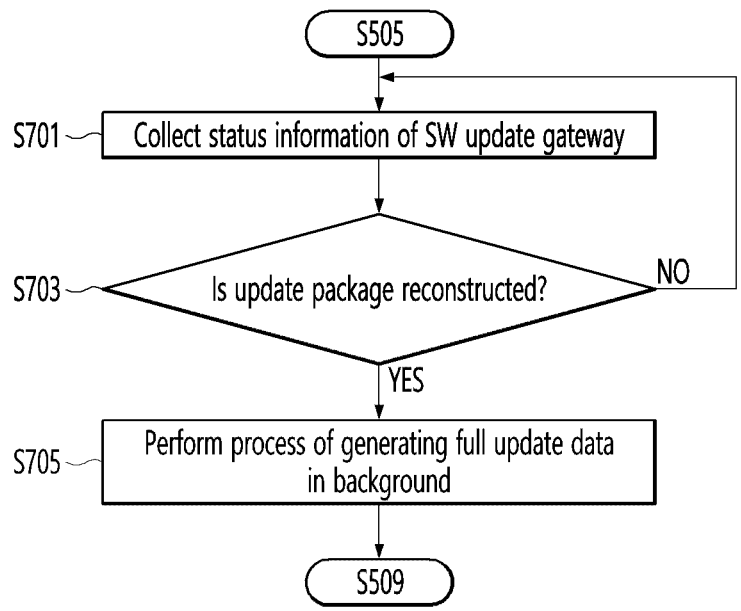
FIG. 7 is a flowchart illustrating an example of step S507 of generating full update data, shown in FIG. 5.

Next, FIG. 7 is a flowchart illustrating an example of step S507 of generating full update data, shown in FIG. 5. Referring to FIG. 7, the processor 130 of the software update gateway 100 can collect status information of the software update gateway 100 (S701).

The processor 130 can collect status information such as temperature, processor resource usage, available processor resources, memory usage, available memory, network usage, available networks, operating process types and the like. Then, the processor 130 of the software update gateway 100 can determine whether to reconstruct an update package based on the status information of the software update gateway 100 (S703).

The processor 130 can determine whether to perform a process of reconstructing an update package based on a determination criterion such as whether a temperature is lower than a reference value or whether the available processor resources are greater than the reference value. For example, when the software update gateway 100 is a TV and the software update gateway 100 is outputting a 4K video, most of the resources of the processor 130 are allocated to video decoding, and thus there may be insufficient processor resources to be allocated to a process for reconstructing an update package. In this instance, the processor 130 can determine not to reconstruct the update package.

As a result of the determination in step S703, when performing the process for reconstructing an update package (Yes in S703), the processor 130 of the software update gateway 100 can perform a process of generating full update data in the background (S705). The processor 130 can generate the full update data for updating the software of the IoT device 200 while maintaining the existing operation of the software update gateway 100 by performing the process of generating the full update data in the background.

When it is determined in step S703 that the process of generating full update data is not performed (No in S703), the process returns to step S701 of collecting status information of the software update gateway 100. Some of the steps shown in FIG. 7 can be performed in parallel.

Figure 8:
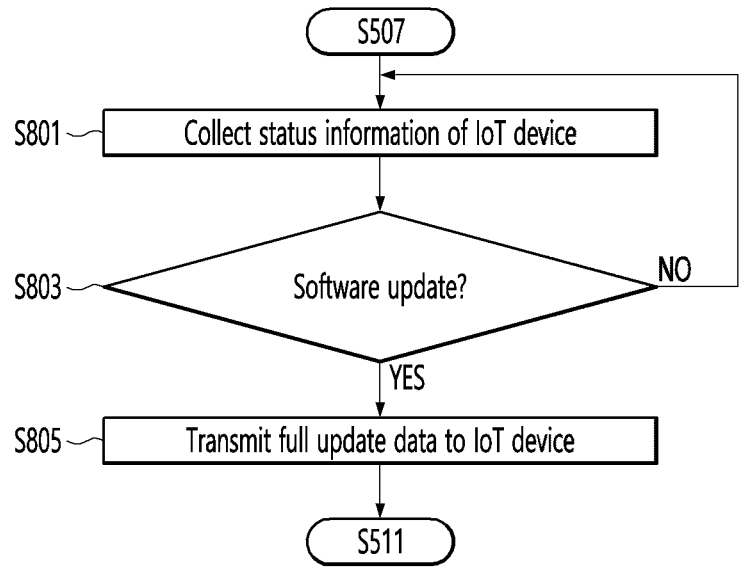
FIG. 8 is a flowchart illustrating an example of step S509 of transmitting full update data to an IoT device, shown in FIG. 5.

Next, FIG. 8 is a flowchart illustrating an example of step S509 of transmitting full update data to an IoT device 200, shown in FIG. 5. Referring to FIG. 8, the processor 130 of the software update gateway 100 can collect status information of the IoT device 200 through the communication unit 110 (S801).

The processor 130 can collect, through the communication unit 110, status information, such as a temperature of the IoT device 200, processor resource usage, available processor resources, memory usage, available memory, network usage, available networks, operation process types, a power status, or a power supply status.

Then, the processor 130 of the software update gateway 100 determines whether to update software based on the status information of the IoT device 200 (S803). The processor 130 can determine whether to perform a software update process for the IoT device 200 based on a determination criteria, such as whether the temperature of the IoT device 200 is lower than a reference value, whether the available processor resources are higher than a reference value, whether the power is turned on (in the power-on status), or whether the power is being supplied.

When the processor 130 determines in step S803 that the software update process is performed, the processor 130 of the software update gateway 100 can transmit full update data to the IoT device 200 through the communication unit 110 (S805). When the processor 130 determines in step S803 that the software update process is not performed, the process returns to step S801 of collecting status information of the IoT device 200. Some of the steps shown in FIG. 8 can also be performed in parallel.

Figure 9:
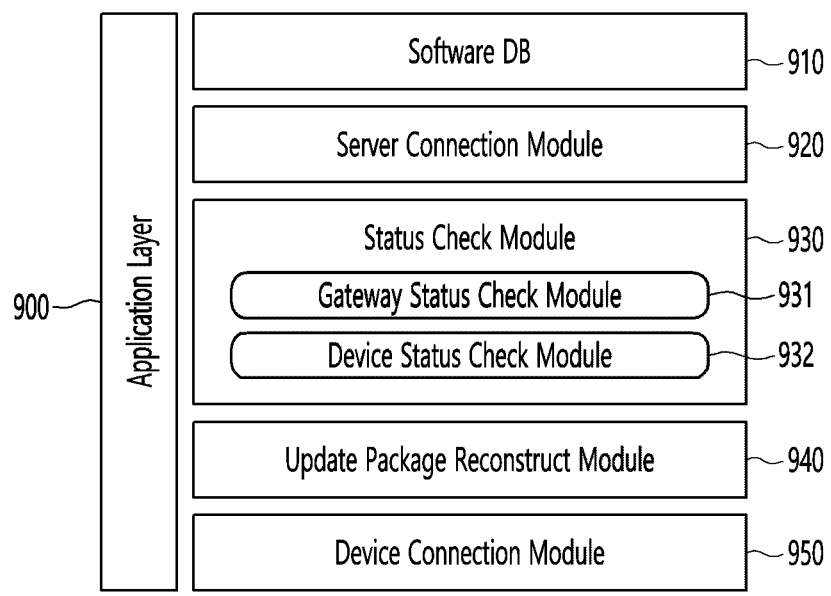
FIG. 9 is a diagram illustrating a software structure of a software update gateway according to an embodiment of the present disclosure.

Next, FIG. 9 is a diagram illustrating a software structure of a software update gateway 100 according to an embodiment of the present disclosure. Referring to FIG. 9, the software performing a function of updating the software of the IoT device 200 in the software update gateway 100 is referred to as an update master, and the update master includes a program installed in an application layer 900.

As shown in FIG. 9, the update master includes a software database 910, a server connection module 920, a status check module 930, an update package reconstruct module 940, a device connection module 950, and the like. The software database 910 can refer to the software database 121 shown in FIG. 2. In addition, the server connection module 920 performs a function of connecting to the software update server 300.

Also, the status check module 930 includes a gateway status check module 931 that performs a function of checking a status of the software update gateway 100 and a device status check module 932 that performs a function of checking a status of the IoT device 200. The update package reconstruct module 940 performs a function of generating or reconstructing full update data corresponding to new version software data based on older version of software data and differential update data. The device connection module 950 performs a function of connecting to the IoT device 200.

In addition, the update package reconstruct module 940 can be configured as a sub-module of the status check module 930 because it is determined whether or not to reconstruct an update package based on the status information of the software update gateway 100 obtained by using the gateway status check module 931.

Figure 10:
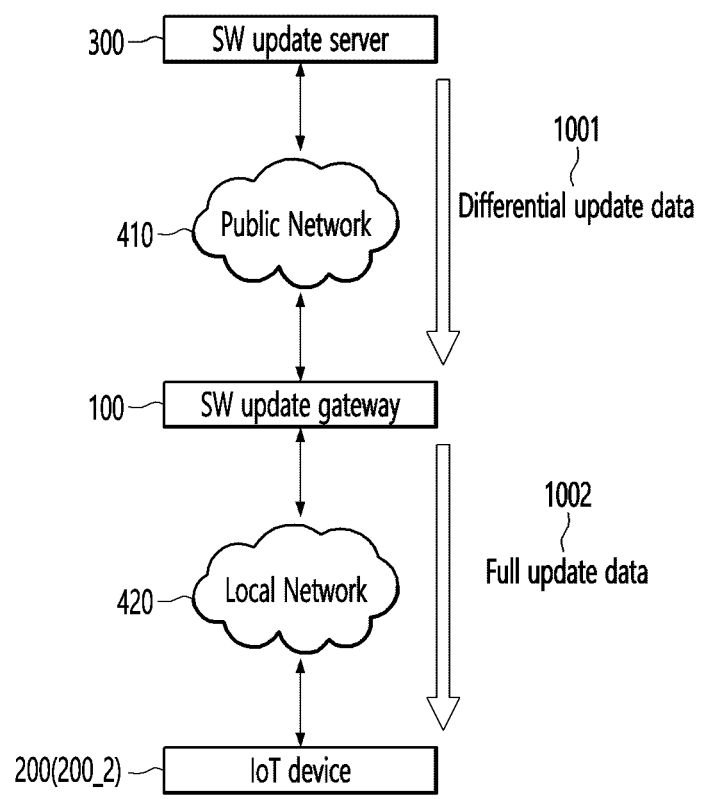
FIG. 10 is a diagram illustrating data transmitted within a software update system for an IoT device.

Next, FIG. 10 is a diagram illustrating data transmitted within the software update system 1 for an IoT device. Referring to FIG. 10, the software update gateway 100 can connect to the software update server 300 via the public network 410 and connect to the IoT device 200 via the local network 420.

The software update gateway 100 can request and receive differential update data 1001 for update target software from the software update server 300 in order to update the software (or update target software) of the IoT device 200. Further, the software update gateway 100 can generate full update data 1002 corresponding to a new version of software based on the received differential update data 1001 and full update data corresponding to old version of software to be updated, and transmit the generated full update data 1002 to the IoT device 200 to update the update target software of the IoT device 200.

Conventionally, the software update gateway 100 receives full update data from the software update server 300 and transmits the received full update data to the IoT device 200, causing a problem in which network traffic in the public network 410 increases. However, in the present disclosure, the software update gateway 100 receives only differential update data from the software update server 300, thus effectively reducing network traffic in the public network 410.

Assuming that the ratio of differential update data (or differential update package) is 20% and software updates are performed 20 times, the amount of data transmission in the public network 410 is reduced by about 76% when software updates are performed according to an embodiment of the present disclosure.

Next, FIG. 11 is a diagram illustrating an example of a software metadata table 1100 stored in the software database 121 of the software update gateway 100. Referring to FIG. 11, the software metadata table 1100 can be stored in the software database 121 of the software update gateway 100. The software metadata table 1100 may contain software metadata for several IoT devices 200.

Further, as shown, the software metadata table 1100 may include a manufacturer name 1111, a device name 1112, device identification information 1113, a software name 1114, software identification information 1115, a current software version 1116, and a latest software version 1117 and the like. In the example shown in FIG. 11, the software metadata corresponding to a first IoT device is first software metadata 1121, and similarly, the software metadata corresponding to an n-th IoT device is referred to as n-th software metadata.

According to the first software metadata 1121, software installed in the third software metadata 1123, and the fourth software metadata 1124, the first IoT device, the third IoT device, and the fourth IoT device are the latest software, so that the IoT devices do not require software updates. On the other hand, according to the second software metadata 1122, the fifth software metadata 1125, and the sixth software metadata 1126, software installed in the second IoT device, the fifth IoT device, and the sixth IoT device are not the latest software, so that the IoT devices require software updates.

According to the second software metadata 1122 and the third software metadata 1123, the second IoT device is a "living room lamp" and the third IoT device is a "bed room lamp," which are different from each other, but are lighting products of the same manufacturer "AA Electronics." The second IoT device and the third IoT device include built-in software having the same software identification information "AA_LAMP." Accordingly, the software update gateway 100 can update the software of the second IoT device and the third IoT device using the same software update data even though the second IoT device and the third IoT device are different from each other.

On the other hand, according to the sixth software metadata 1126, the sixth IoT device is also a "toilet lamp" which is a lighting product, but is a product of "CC Electronics," a manufacturer different from the second IoT device and the third IoT device and includes built-in software having software identification information "CC_LAMP" different from the second IoT device and the third IoT device is loaded. Accordingly, the software update gateway 100 can update its own software using software update data for the sixth IoT device that is different from the software update data for the second IoT device and the third IoT device.

According to the fifth software metadata 1126, the current software version 1116 of software "camera firmware" installed in the fifth IoT device is "v2," and the latest software version 1117 thereof is "v4," so that it can be known that updates have not performed two times. The software update gateway 100 may generate full update data of "camera firmware" of version "v4" from full update data of "camera firmware" of version "v2," differential update data of "camera firmware" of version "v3," and differential update data of "camera firmware" of version "v4" and update the software of the fifth IoT device using the generated full update data.

Next, FIG. 12 is a diagram illustrating examples of software update data stored in the software database 121 of the software update gateway 100. Referring to FIG. 12, software data corresponding to software of an IoT device can be stored in the software database 121 of the software update gateway 100, and the software data can contain differential update data 1213 in which software identification information 1211 and a software version 1212 are distinguished from each other, and full update data 1214. The examples shown in FIG. 12 correspond to the software metadata table 1100 shown in FIG. 11.

As for the first software 1221 whose software identification information 1211 is "AA_AIR," both the current software version 1116 and the latest software version 1117 are "v1," so that full update data for the first software whose software version 1212 is "v1" can be stored in the software database 121.

As for the second software 1222 whose software identification information 1211 is "AA_LAMP," the current software version 1116 is "v1" and the latest software version 1117 is "v2," so that full update data for the second software 1222 whose software version 1212 is "v1," differential update data for the second software 1222 whose software version 1212 is "v2" and full update data for the second software 1222 whose software version 1212 is "v2" can be stored in the software database 121.

As for the third software 1223 whose software identification information 1211 is "BB_WASH," both the current software version 1116 and the latest software version 1117 are "v3," so that full update data for the third software whose software version 1223 is "v3" can be stored in the software database 121.

As for the fourth software 1224 whose software identification information 1211 is "BB_CAM," the current software version 1116 is "v2" and the latest software version 1117 is "v4," so that full update data for the fourth software 1224 whose software version 1212 is "v2," differential update data for the fourth software 1224 whose software version 1212 is "v3," full update data for the fourth software 1224 whose software version 1212 is "v3," differential update data for the fourth software 1224 whose software version 1212 is "v4," and full update data for the fourth software 1224 whose software version 1212 is "v4" can be stored in the software database 121.

As for the fifth software 1225 whose software identification information 1211 is "CC_LAMP," the current software version 1116 is "v1" and the latest software version 1117 is "v2," so that full update data for the fifth software 1225 whose software version 1212 is "v1," differential update data for the fifth software 1225 whose software version 1212 is "v1," differential update data for the fifth software 1225 whose software version 1212 is "v2," and full update data for the fifth software 1225 whose software version 1212 is "v2" can be stored in the software database 121.

According to an embodiment of the present disclosure, the above-described method can be implemented with codes readable by a computer on a medium in which a program is recorded. The computer-readable medium includes all kinds of recording devices in which data readable by a computer system is stored. Examples of the computer readable medium include a hard disk drive (HDD), a solid status disk (SSD), a silicon disk drive (SDD), a ROM, a RAM, a CD-ROM, a magnetic tape, a floppy disk, an optical data storage device, and the like.

The invention claimed is:

1. A software update gateway for updating a software of an IoT (Internet of Things) device, comprising:
    a transceiver configured to:
        connect to a software update server through a public network,
        connect to at least one first IoT device through the public network, and
        connect to at least one second IoT device through a local network of the at least one second IoT device;
    a software database configured to store a first version of a full update data for a software of the at least one first IoT device; and
    a processor configured to:
        control the transceiver to receive a software update request from the at least one first IoT device via the public network,
        control the transceiver to transfer the software update request to the software update server via the public network,
        control the transceiver to receive differential update data for the software of the at least one first IoT device from the software update server via the public network,
        generate a second version of the full update data for the software of the at least one first IoT device based on the first version and the differential update data, and
        control the transceiver to transmit the generated second version of the full update data of the at least one first IoT device to the at least one first IoT device via the public network based on a collected operational status of the software update gateway.

2. The software update gateway of claim 1, wherein the software database is configured to further store first software metadata for the software of the at least one first IoT device, and
    wherein the first software metadata includes first device identification information, first software identification information, and first software version information of the at least one first IoT device.

3. The software update gateway of claim 2, wherein the processor is configured to:
    control the transceiver to receive the first software metadata from the least one first IoT device via the public network,
    determine whether the software for the at least one first IoT device is updatable based on the first software metadata, and
    control the transceiver to transmit a software update notification to the at least one first IoT device through the public network when the software of the at least one first IoT device is determined to be updateable.

4. The software update gateway of claim 3, wherein the processor is configured to compare the stored first software version information with software version information in the software update server to determine whether the software of the at least one first IoT device is updateable.

5. The software update gateway of claim 1, wherein the processor is configured to:
    collect operational status information of the software update gateway, and
    determine the operational status of the software update gateway based on the collected operational status information.

6. The software update gateway of claim 5, wherein the operational status information of the software update gateway includes at least one of a temperature of the software update gateway, processor resource usage, available processor resources, memory usage, available memory, network usage, available networks, or operation process types.

7. The software update gateway of claim 6, wherein the processor is configured to determine to generate the second version of the full update data when the temperature for the software update gateway is less than a temperature reference value and the available processor resources are greater than an available processor resources reference value.

8. The software update gateway of claim 5, wherein the processor is configured to generate the second version of the full update data in the background when the processor determines to generate the second version of the full update data.

9. The software update gateway of claim 1, wherein the processor is configured to:
    control the transceiver to receive operational status information of the at least one first IoT device, and
    determine whether to update the software for the at least one first IoT device based on the received operational status information of the at least one first IoT device.

10. The software update gateway of claim 9, wherein the operational status information of the at least one first IoT device includes at least one of a temperature, processor resource usage, available processor resources, memory usage, available memory, network usage, available networks, operation process types, a power status, or a power supply status of the at least one first IoT device.

11. The software update gateway of claim 10, wherein the processor is configured to determine to update the software of the at least one first IoT device when the temperature of the at least one first IoT device is less than a temperature reference value, the available processor resources of the at least one first IoT device are greater than an available processor resource reference value, and the power status of the at least one first IoT device is a power-on status.

12. The software update gateway of claim 1, wherein the software database configured to store a first version of a full update data for a software of the at least one second IoT device, and
wherein the processor is configured to:
control the transceiver to receive a software update request from the at least one second IoT device via the local network,
control the transceiver to transfer the software update request to the software update server via the public network,
control the transceiver to receive differential update data for the software of the least one second IoT device from the software update server via the public network,
generate a second version of the full update data for the software of the at least one second IoT device based on the first version and the differential update data, and
control the transceiver to transmit the generated second version of the full update data of the at least one second IoT device to the at least one second IoT device via the local network.

13. The software update gateway of claim 12, wherein the software database is configured to further store second software metadata for the software of the at least one second IoT device, and
wherein the second software metadata includes second device identification information, second software identification information, and second software version information of the at least one second IoT device.

14. The software update gateway of claim 13, wherein the processor is configured to:
control the transceiver to receive the first software metadata from the least one second IoT device via the local network,
determine whether the software for the at least one second IoT device is updatable based on the received second software metadata of the at least one second IoT device, and
control the transceiver to transmit a software update notification to the at least one second IoT device through the local network when the software of the at least one second IoT device is determined to be updateable.

15. The software update gateway of claim 14, wherein the processor is configured to compare the stored second software version information of the at least one second IoT device with software version information in the software update server for the at least one second IoT device to determine whether the software of the at least one second IoT device is updateable.

16. The software update gateway of claim 12, wherein the processor is configured to:
control the transceiver to receive operational status information of the at least one second IoT device, and
determine whether to update the software for the at least one second IoT device based on the received operational status information of the at least one second IoT device.

17. The software update gateway of claim 16, wherein the operational status information of the at least one second IoT device includes at least one of a temperature, processor resource usage, available processor resources, memory usage, available memory, network usage, available networks, operation process types, a power status, or a power supply status of the at least one second IoT device.

18. The software update gateway of claim 17, wherein the processor is configured to determine to update the software of the at least one second IoT device when the temperature of the at least one second IoT device is less than a temperature reference value, the available processor resources of the at least one second IoT device are greater than an available processor resource reference value, and the power status of the at least one second IoT device is a power-on status.

19. The software update gateway of claim 17, wherein the at least one first IoT device comprises multiple first IoT devices, and
wherein the at least one second IoT device comprises multiple second IoT devices.

20. A method for controlling a software update gateway, the method comprising:
connecting, via a transceiver of the software update gateway, to a software update server through a public network;
connecting, via the transceiver, to at least one first IoT device through the public network;
connecting, via the transceiver, to at least one second IoT device through a local network of the at least one second IoT device;
storing in a software database of the software update gateway, a first version of a full update data for a software of the at least one first IoT device;
receiving, via the transceiver, a software update request from the at least one first IoT device via the public network;
transferring, via the transceiver, the software update request to the software update server via the public network;
receiving, via the transceiver, differential update data for the software of the at least one first IoT device from the software update server via the public network;
generating, via a processor of the software update gateway, a second version of the full update data for the software of the at least one first IoT device based on the first version and the differential update data; and
transmitting, via the transceiver, the generated second version of the full update data of the at least one first IoT device to the at least one first IoT device via the public network based on a collected operational status of the software update gateway.

* * * * *